United States Patent
Ozaki et al.

(10) Patent No.: US 9,740,976 B2
(45) Date of Patent: Aug. 22, 2017

(54) RFID TAG AND MANUFACTURING METHOD THEREOF

(71) Applicant: FUJITSU LIMITED, Kawasaki-shi, Kanagawa (JP)

(72) Inventors: Noritsugu Ozaki, Yokohama (JP); Shunji Baba, Yokohama (JP); Takayoshi Matsumura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 88 days.

(21) Appl. No.: 15/012,967

(22) Filed: Feb. 2, 2016

(65) Prior Publication Data
US 2016/0155041 A1    Jun. 2, 2016

Related U.S. Application Data

(63) Continuation of application No. PCT/JP2013/071973, filed on Aug. 15, 2013.

(51) Int. Cl.
*G06K 19/07* (2006.01)
*H01Q 1/22* (2006.01)
(Continued)

(52) U.S. Cl.
CPC ....... *G06K 19/0723* (2013.01); *G06K 19/022* (2013.01); *G06K 19/07786* (2013.01);
(Continued)

(58) Field of Classification Search
CPC .......... G06K 19/0723; G06K 19/022; G06K 19/07786; H01Q 1/2208; H01Q 9/065; H01Q 9/285; H01Q 7/00
See application file for complete search history.

(56) References Cited

U.S. PATENT DOCUMENTS 4,774,521 A * 9/1988 Okada .................. G08B 13/242
  257/E27.114
6,169,925 B1 * 1/2001 Villaseca ........... A61N 1/37229
  128/903
(Continued)

FOREIGN PATENT DOCUMENTS

JP    2006-053833 A    2/2006
JP    2008-090813 A    4/2008
(Continued)

OTHER PUBLICATIONS

International Search Report, mailed in connection with PCT/JP2013/071973 and mailed Sep. 10, 2013 (1 page).
(Continued)

*Primary Examiner* — Daniel Walsh
(74) *Attorney, Agent, or Firm* — Fujitsu Patent Center

(57) ABSTRACT

An RFID tag includes a core formed by a first elastic material and having a first surface, a second surface on an opposite side of the first surface, and a pair of end parts provided on mutually opposite sides and connecting to the first surface and the second surface. The RFID tag further includes a metal layer provided on the first surface, a semiconductor chip provided on the second surface, and a dipole antenna provided on the second surface and electrically connected to the semiconductor chip. One of the metal layer and the dipole antenna is folded at folded parts at the pair of end parts, and the metal layer and the dipole antenna overlap at the folded parts.

24 Claims, 11 Drawing Sheets

(51) Int. Cl.
  *H01Q 7/00* (2006.01)
  *H01Q 9/06* (2006.01)
  *H01Q 9/28* (2006.01)
  *G06K 19/02* (2006.01)
  *G06K 19/077* (2006.01)

(52) U.S. Cl.
  CPC ............ *H01Q 1/2208* (2013.01); *H01Q 7/00* (2013.01); *H01Q 9/065* (2013.01); *H01Q 9/285* (2013.01)

(56) References Cited

U.S. PATENT DOCUMENTS

| | | | | |
|---|---|---|---|---|
| 6,650,301 | B1* | 11/2003 | Zimmerman | H01Q 9/26 343/795 |
| 6,836,215 | B1* | 12/2004 | Laurash | G06K 1/12 156/60 |
| 7,201,328 | B2* | 4/2007 | Usami | G06K 19/07728 235/492 |
| 8,917,214 | B2* | 12/2014 | Forster | H01Q 7/00 343/728 |
| 9,317,801 | B2* | 4/2016 | Hoelzl | G06K 19/0776 |
| 2002/0031997 | A1* | 3/2002 | Lawler, Jr. | A22B 5/0064 452/173 |
| 2003/0033713 | A1* | 2/2003 | Hausladen | G06K 19/07749 29/873 |
| 2004/0074974 | A1* | 4/2004 | Senba | G06K 7/10336 235/492 |
| 2004/0145450 | A1* | 7/2004 | Katagiri | G07C 9/00944 340/5.72 |
| 2004/0169086 | A1* | 9/2004 | Ohta | G06K 19/06046 235/492 |
| 2004/0174257 | A1* | 9/2004 | Kuhns | G06K 19/02 340/508 |
| 2005/0079386 | A1* | 4/2005 | Brown | B82Y 10/00 428/690 |
| 2005/0085010 | A1* | 4/2005 | Tsunoda | G06K 7/0095 438/106 |
| 2006/0032926 | A1* | 2/2006 | Baba | G06K 19/07749 235/492 |
| 2006/0043199 | A1* | 3/2006 | Baba | G06K 19/07749 235/492 |
| 2006/0117619 | A1* | 6/2006 | Costantini | A01K 11/004 40/301 |
| 2006/0119534 | A1* | 6/2006 | Semba | G06K 7/10178 343/907 |
| 2006/0232418 | A1* | 10/2006 | Baba | G06K 19/07749 340/572.7 |
| 2007/0023517 | A1* | 2/2007 | Tan | G06K 19/07749 235/435 |
| 2007/0046475 | A1* | 3/2007 | Carrender | G08B 13/24 340/572.7 |
| 2007/0229276 | A1 | 10/2007 | Yamagajo et al. | |
| 2008/0055045 | A1* | 3/2008 | Swan | G06K 19/07749 340/10.1 |
| 2008/0122628 | A1* | 5/2008 | Kai | G06K 19/0723 340/572.7 |
| 2008/0122630 | A1 | 5/2008 | Baba et al. | |
| 2008/0186245 | A1* | 8/2008 | Hilgers | G06K 19/07749 343/803 |
| 2008/0315992 | A1* | 12/2008 | Forster | G06K 19/07749 340/10.1 |
| 2009/0096612 | A1* | 4/2009 | Seppa | H01Q 9/0421 340/572.7 |
| 2009/0130393 | A1* | 5/2009 | Kobayashi | G06K 19/02 428/173 |
| 2009/0321531 | A1* | 12/2009 | Speich | D06H 1/04 235/492 |
| 2010/0164726 | A1* | 7/2010 | Tada | G06K 19/07749 340/572.7 |
| 2010/0283690 | A1* | 11/2010 | Artigue | G06K 7/10178 343/702 |
| 2011/0068904 | A1 | 3/2011 | Baba et al. | |
| 2011/0121080 | A1 | 5/2011 | Kai et al. | |
| 2011/0121947 | A1* | 5/2011 | Kubota | B32B 5/28 340/10.1 |
| 2011/0169702 | A1* | 7/2011 | Wendisch | H01Q 7/00 343/702 |
| 2011/0262305 | A1* | 10/2011 | Visinoni | B01L 3/545 422/68.1 |
| 2011/0315774 | A1* | 12/2011 | Baba | G06K 19/0772 235/488 |
| 2012/0013469 | A1 | 1/2012 | Kai et al. | |
| 2012/0029997 | A1* | 2/2012 | Khan | G06Q 30/0226 705/14.27 |
| 2012/0235870 | A1* | 9/2012 | Forster | H01Q 7/00 343/728 |
| 2012/0318874 | A1* | 12/2012 | Germann | G06K 19/07718 235/492 |
| 2014/0021262 | A1* | 1/2014 | Matsumura | G06K 19/07749 235/488 |
| 2014/0191046 | A1* | 7/2014 | Lacaze | G06K 19/025 235/492 |
| 2014/0224884 | A1* | 8/2014 | Liu | G06K 19/0773 235/492 |
| 2016/0155041 | A1* | 6/2016 | Ozaki | H01Q 1/2208 235/488 |

FOREIGN PATENT DOCUMENTS

| | | |
|---|---|---|
| JP | 2008-210344 A | 9/2008 |
| JP | 2011-109552 A | 6/2011 |
| WO | 2008105133 A1 | 9/2008 |

OTHER PUBLICATIONS

Extended European Search Report dated Jun. 30, 2016 for corresponding European Patent Application No. 13891497.3, 7 pages.

\* cited by examiner

RFID TAG AND MANUFACTURING METHOD THEREOF

CROSS-REFERENCE TO RELATED APPLICATIONS

This application is a continuation application of International Application No. PCT/JP2013/071973 filed on Aug. 15, 2013 and designated the U.S., the entire contents of which are incorporated herein by reference.

FIELD

The embodiments discussed herein are related to an RFID (Radio Frequency IDentification) tag and a manufacturing method thereof. The RFID tag is sometimes also referred to as an IC (Integrated Circuit) tag.

BACKGROUND

The RFID tag is used in various fields. In addition, a communication system between the RFID tag and a tag reader or a tag writer includes an electromagnetic induction system and a radio wave system. The RFID tag may be mounted on a curved surface, a metal surface, or the like. In a case in which the RFID tag is mounted on the curved surface, a core of the RFID is desirably formed by an elastic material.

On the other hand, in a case in which the radio wave system RFID is mounted on the metal surface, a communication distance communicable between the RFID tag and the tag reader or the tag writer can be improved by forming an antenna in a loop shape. However, in a case in which when mounting the RFID tag on an inner side or an outer side of a metal pipe having a relatively small diameter, for example, it is difficult to form the loop-shaped antenna part to have a suitable elasticity, even when the core of the RFID tag is formed by the elastic material. For this reason, as a radius of curvature of the curved surface becomes smaller, wrinkles or cracks may be formed at the loop-shaped antenna part of the RFID tag, and in a worst case, the RFID tag is broken or damaged. In addition, in a case in which the RFID tag is adhered on the curved surface using an adhesive tape or the like, the smaller the radius or curvature of the curves surface, the easier the mounted RFID tag separates from the adhered curved surface, because it is difficult to form the loop-shaped antenna part to have the suitable elasticity.

The curved surface may include a plurality of concave parts and convex parts, or a plurality of concave parts or convex parts having different radii of curvature. In these cases, it is also difficult to mount the RFID tag having the loop-shaped antenna on the curved surface.

Hence, the conventional RFID tag having the loop-shaped antenna is unsuited for mounting on the curved surface.

Related art may include Japanese Laid-Open Patent Publications No. 2006-53833, No. 2011-109552, and No. 2008-90813, for example.

SUMMARY

Accordingly, it is an object in one aspect of the embodiments to provide an RFID tag having a loop-shaped antenna and suited for mounted on a curved surface, and a manufacturing method thereof.

According to one aspect of the embodiments, an RFID tag includes a core formed by a first elastic material and having a first surface, a second surface on an opposite side of the first surface, and a pair of end parts provided on mutually opposite sides and connecting to the first surface and the second surface; a first metal layer provided on the first surface; a semiconductor chip provided on the second surface and having a communication part; and a dipole antenna provided on the second surface and electrically connected to the semiconductor chip, wherein one of the first metal layer and the dipole antenna is folded at folded parts at the pair of end parts, and the first metal layer and the dipole antenna overlap at the folded parts.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1A:
FIGS. 1A, 1B, 1C, and 1D are cross sectional views for explaining a manufacturing method of an RFID tag in a first embodiment.

Preferred embodiments of the present invention will be described with reference to the accompanying drawings.

According to the disclosed RFID tag and manufacturing method thereof, a core is formed by an elastic material and has a first surface, a second surface on an opposite side of the first surface, and a pair of end parts provided on mutually opposite sides and connecting to the first surface and the second surface. A first metal layer is provided on the first surface, and a semiconductor chip provided on the second surface and has a communication part. A dipole antenna is provided on the second surface and is electrically connected to the semiconductor chip. One of the first metal layer and the dipole antenna is folded at folded parts at the pair of end parts, and the first metal layer and the dipole antenna overlap at the folded parts.

Next, a description will be given the disclosed RFID tag and manufacturing method thereof in each embodiment, by referring to the drawings.

First Embodiment

First, a description will be given of a manufacturing method of an RFID tag in a first embodiment, by referring to FIGS. 1A through 1D. FIGS. 1A through 1D are cross sectional views for explaining the manufacturing method of the RFID tag in the first embodiment. In FIGS. 1A through 1D and FIGS. 2A through 14 which will be described later, dimensions including thicknesses of each of layers are illustrated for easy viewing, and proportions of the dimensions including the thicknesses of each of the layers in these figures do not correspond to actual proportions of the dimensions including the thicknesses of each of the layers.

First, as illustrated in FIG. 1A, a core 1 formed by an elastic material is prepared. In this example, the core 1 is formed by a plate-shaped dielectric having a thickness of 0.8 mm, for example, and has a rectangular shape in a plan view. The dielectric may be PVC (Poly-Vinyl Chloride), silicone rubber, or the like, for example. The core 1 has a flat lower surface which is an example of a first surface, and a flat upper surface which is an example of a second surface. The thickness of the dielectric forming the core 1 may be in a range of 0.5 mm to 1.5 mm, for example.

Figure 1B:
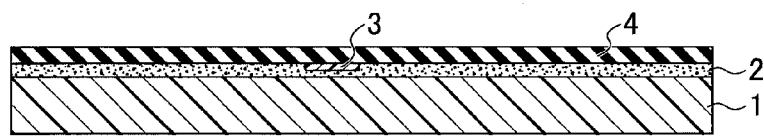

Next, as illustrated in FIG. 1B, an adhesive layer 2 having a thickness of 0.05 mm, for example, is formed on the upper surface of the core 1. An adhesive agent used for the adhesive layer 2 is not limited to a particular adhesive agent as long as the adhesive agent has elasticity after curing. The thickness of the adhesive layer 2 may be in a range of 0.05 mm to 0.15 mm, for example. A tag chip 3 which is an example of a semiconductor chip, is provided on a surface of an insulator layer 4 formed by an elastic material and formed with a pattern of a metal layer (not illustrated). The surface (lower surface in FIG. 1B) of the insulator layer 4 provided with the pattern of the metal layer and the tag chip 3 is adhered on the adhesive layer 2. The pattern of the metal layer made of copper (Cu), silver (Ag), gold (Au), aluminum (Al), or the like is formed on one surface of a PET (Poly-Ethylene Terephthalate) having a thickness of 0.05 mm, for example, and a part of the tag chip 3 electrically connecting to the patterns of the metal layer has a thickness of 0.21 mm, for example. The pattern of the metal layer forms a dipole antenna. In this example, the tag chip 3 is provided at a central part of the surface of the insulator layer 4 formed with the pattern of the metal layer, and thus, in a state in which the insulator layer 4 is adhered to the adhesive layer 2, the tag chip 3 is provided at a central part of the upper surface of the core 1.

Figure 1C:
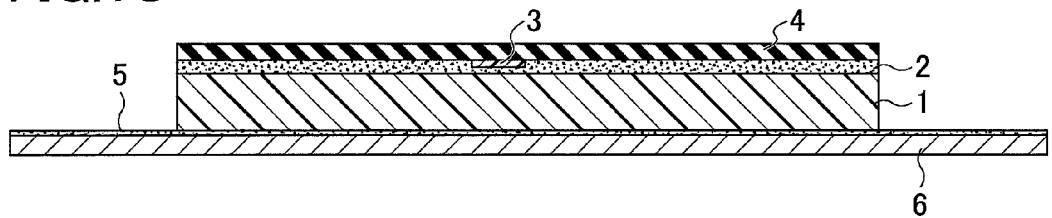

Next, as illustrated in FIG. 1C, an adhesive layer 5 having a thickness of 0.05 mm, for example, is formed on the lower surface of the core 1. An adhesive agent used for the adhesive layer 5 is not limited to a particular adhesive agent as long as the adhesive agent has elasticity after curing, and may be the same as the adhesive agent used for the adhesive layer 2. The thickness of the adhesive layer 5 may be in a range of 0.05 mm to 0.15 mm, for example. A metal layer 6 is adhered to the adhesive layer 5. The metal layer 6 is formed by a metal or alloy that is relatively soft and suited for bending, such as tin (Sn), zinc (Zn), lead (Pb), indium (In), or an alloy including at least one of these metals, and has a thickness of 0.30 mm, for example. In this example, the metal forming the pattern of the metal layer formed on the insulator layer 4 and the metal forming the metal layer 6 are different. The thickness of the metal layer 6 may be in a range of 0.15 mm to 0.30 mm, for example.

Figure 1D:
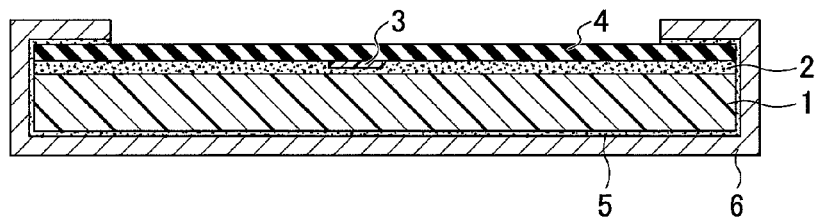

Next, as illustrated in FIG. 1D, the adhesive layer 5 and the metal layer 6 are folded at both end parts of the core 1. In the example illustrated in FIG. 1D, the adhesive layer 5 and the metal layer 6 are once bent in a vertical direction (upward direction) along the end parts of the core 1, and are further bent in a horizontal direction (that is, in a direction towards the central part provided with the tag chip 3) along an upper surface of the insulator layer 4. In other words, the adhesive layer 5 and the metal layer 6 are folded in a horizontal U-shape at both end parts of the core 1. Accordingly, both end parts of the adhesive layer 5 are adhered on the upper surface of the insulator layer 4. The RFID tag illustrated in FIG. 1D can be made thin because the thicknesses of the adhesive layers 2 and 5 are slightly reduced (for example, by approximately 10%) during the curing, and the thickness of the RFID tag is 1.745 mm, for example. In addition, a cost and a weight of the RFID tag can also be reduced.

At the folded parts where the metal layer 6 is folded in the horizontal U-shape at both end parts of the core 1, the metal layer 6 and the dipole antenna formed by the pattern of the metal layer on the insulator layer 4 overlap, to form a loop-shaped antenna. Hence, even in a case in which the RFID tag is mounted on a metal surface, for example, it is possible to improve a communication distance communicable between the RFID tag and a tag reader (not illustrated) or a tag writer (not illustrated).

In addition, because the folded parts of the metal layer 6 hold both ends of the insulator layer 4 or the like, even in a case in which the entire RFID tag is bent when mounting the RFID tag on a curved surface, for example, it was confirmed that the insulator layer 4, the metal layer 6, or the like of the RFID tag do not separate from the core 1, and that wrinkles or cracks are uneasily formed in the RFID tag. Moreover, even in a case in which a lower surface of the RFID tag illustrated in FIG. 1D is mounted on a curved surface having a radius of curvature that is 15 mm, for example, using an adhesive tape, it was confirmed that the RFID tag is uneasily broken or damaged. Hence, it was confirmed that the RFID tag is suited for mounting on the curved surface.

Second Embodiment

Next, a description will be given of the manufacturing method of the RFID tag in a second embodiment, by referring to FIGS. 2A through 2D. FIGS. 2A through 2D are cross sectional views for explaining the manufacturing method of the RFID tag in the second embodiment. In FIGS. 2A through 2D, those parts that are the same as those corresponding parts in FIGS. 1A through 1D are designated by the same reference numerals, and a description thereof will be omitted.

Figure 2A:
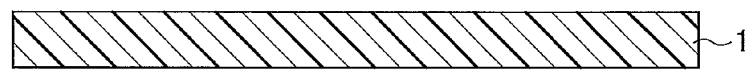
FIGS. 2A, 2B, 2C, and 2D are cross sectional views for explaining the manufacturing method of the RFID tag in a second embodiment.

First, as illustrated in FIG. 2A, the core 1 formed by an elastic material is prepared.

Figure 2B:
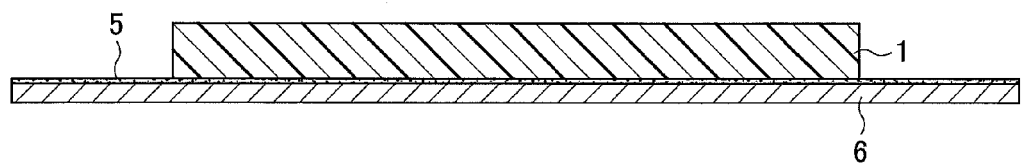

Next, as illustrated in FIG. 2B, the adhesive layer 5 is formed on the lower surface of the core 1. The metal layer 6 is adhered on the adhesive layer 5.

Figure 2C:
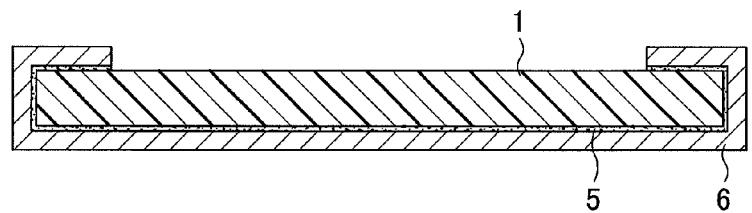

Next, as illustrated in FIG. 2C, the adhesive layer 5 and the metal layer 6 are folded at both end parts of the core 1. In the example illustrated in FIG. 2C, the adhesive layer 5 and the metal layer 6 are once bent in a vertical direction (upward direction) along the end parts of the core 1, and are further bent in a horizontal direction (that is, in a direction towards a central part provided with the tag chip 3) along the upper surface of the core 1. In other words, the adhesive layer 5 and the metal layer 6 are folded in a horizontal U-shape at both end parts of the core 1. Accordingly, both end parts of the adhesive layer 5 are adhered on the upper surface of the core 1.

Figure 2D:
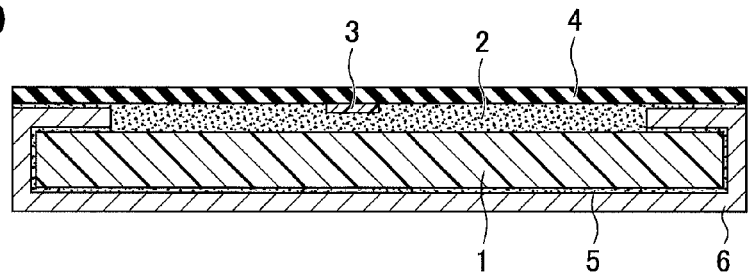

Next, as illustrated in FIG. 2D, the adhesive layer 2 is formed on the upper surface of the core 1, and on an upper surface of folded parts where the metal layer 6 is folded in the horizontal U-shape at both end parts of the core 1. The tag chip 3 is provided on the surface of the insulator layer 4 formed by an elastic material, and formed with the pattern of the metal layer (not illustrated). The surface (lower surface in FIG. 2D) of the insulator layer 4 provided with the pattern of the metal layer and the tag chip 3 is adhered on the adhesive layer 2, and formed with the pattern of the metal layer (not illustrated). The RFID tag illustrated in FIG. 2D can be made thin because the thicknesses of the adhesive layers 2 and are slightly reduced during the curing, and the thickness of the RFID tag is 1.745 mm, for example. In addition, the cost and the weight of the RFID tag can also be reduced. Moreover, because the insulator layer 4 is formed on the folded parts of the metal layer 6, not only the lower surface but also the upper surface of the RFID tag can be made flat.

At the folded parts where the metal layer 6 is folded in the horizontal U-shape at both end parts of the core 1, the metal layer 6 and the dipole antenna formed by the pattern of the metal layer on the insulator layer 4 overlap, to form a loop-shaped antenna. Hence, even in a case in which the RFID tag is mounted on a metal surface, for example, it is possible to improve the communication distance communicable between the RFID tag and the tag reader (not illustrated) or the tag writer (not illustrated).

In addition, because the folded parts of the metal layer 6 hold both ends of the core 1, the insulator layer 4, or the like, even in a case in which the entire RFID tag is bent when mounting the RFID tag on a curved surface, for example, it was confirmed that the insulator layer 4, the metal layer 6, or the like of the RFID tag do not separate from the core 1, and that wrinkles or cracks are uneasily formed in the RFID tag. Moreover, even in a case in which a lower surface or an upper surface of the RFID tag illustrated in FIG. 2D is mounted on a curved surface having a radius of curvature that is 15 mm, for example, using an adhesive tape, it was confirmed that the RFID tag is uneasily broken or damaged. Hence, it was confirmed that the RFID tag is suited for mounting on the curved surface.

Third Embodiment

Next, a description will be given of the manufacturing method of the RFID tag in a third embodiment, by referring to FIGS. 3A through 3D. FIGS. 3A through 3D are cross sectional views for explaining the manufacturing method of the RFID tag in the third embodiment. In FIGS. 3A through 3D, those parts that are the same as those corresponding parts in FIGS. 1A through 1D are designated by the same reference numerals, and a description thereof will be omitted. In this embodiment, a protection layer is formed on the upper surfaces of the insulator layer 4 and the folded parts in FIG. 1D.

Figure 3A:
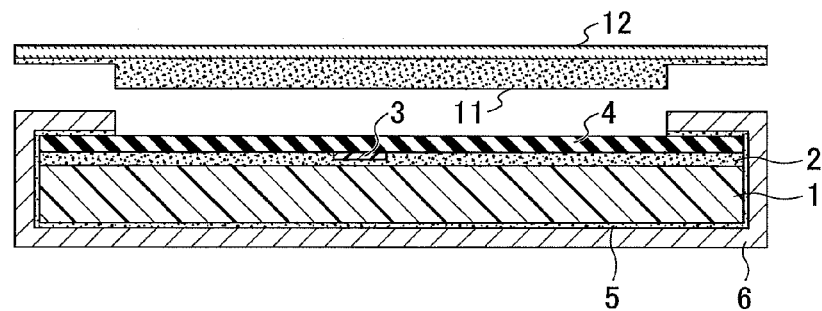
FIGS. 3A, 3B, 3C, and 3D are cross sectional views for explaining the manufacturing method of the RFID tag in a third embodiment.
Figure 3B:
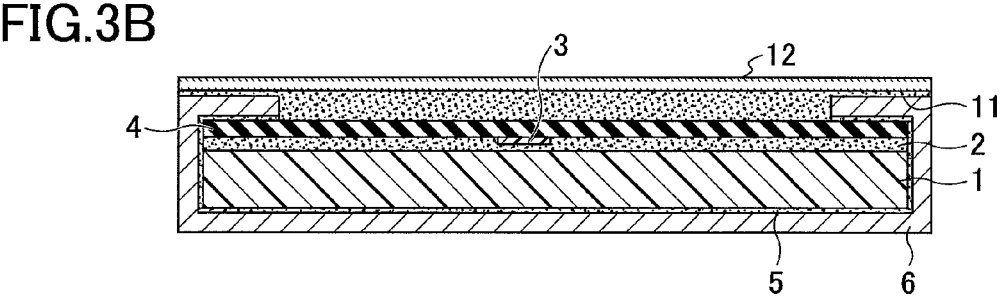

As illustrated in FIGS. 3A and 3B, a protection layer 12 is formed on the upper surface of the RFID tag in the first embodiment illustrated in FIG. 1D, via an adhesive layer 11. An adhesive agent used for the adhesive layer 11 is not limited to a particular adhesive agent as long as the adhesive agent has elasticity after curing, and may be the same as the adhesive agent used for the adhesive layer 2 or the adhesive layer 5. A material used for the protection layer 12 is not limited to a particular material as long as the material has elasticity, and may be a flame resistant material, for example. The adhesive layer 11 has a thickness of 0.05 mm, for example, and the protection layer 12 has a thickness of 0.15 mm, for example. A combination of the adhesive layer 11 and the protection layer 12 may be a film coated with an adhesive agent, for example. The adhesive layer 11 may have a thickness in a range of 0.05 mm to 0.15 mm, for example. In addition, the protection layer 12 may have a thickness in a range of 0.05 mm to 0.15 mm, for example.

Figure 3C:
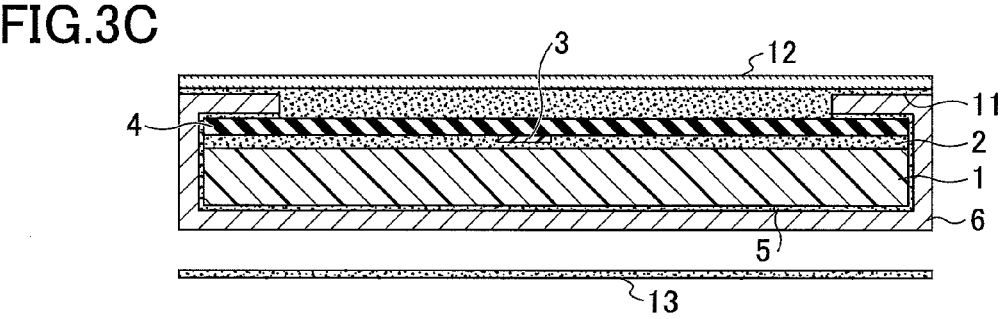
Figure 3D:
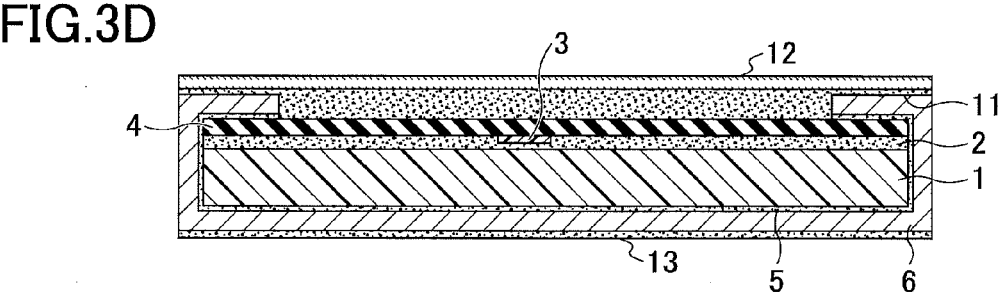

Next, as illustrated in FIGS. 3C and 3D, an adhesive layer 13 is formed on a lower surface of the metal layer 6. An adhesive agent used for the adhesive layer 13 is not limited to a particular adhesive agent as long as the adhesive agent has elasticity after curing, and may be the same as the adhesive agent used for the adhesive layer 2, or the adhesive layer 5, or the adhesive layer 11. The adhesive layer 13 has a thickness of 0.05 mm, for example. The adhesive layer 13 may be formed by an adhesive tape, for example. The adhesive layer 13 may have a thickness in a range of 0.05 mm to 0.15 mm, for example. The RFID tag illustrated in FIG. 3D can be made thin because the thicknesses of the adhesive layers 2, 5, 11, and 13 are slightly reduced during the curing, and the thickness of the RFID tag is 1.94 mm, for example. In addition, the cost and the weight of the RFID tag can also be reduced. Moreover, because the protection layer 12 is formed on the folded parts of the metal layer 6, not only the lower surface but also the upper surface of the RFID tag can be made flat. Furthermore, in a case in which the flame resistant material is used for the protection layer 12, the RFID tag can be used in a high-temperature environment, for example.

At the folded parts where the metal layer 6 is folded in the horizontal U-shape at both end parts of the core 1, the metal layer 6 and the dipole antenna formed by the pattern of the metal layer on the insulator layer 4 overlap, to form a loop-shaped antenna. Hence, even in a case in which the RFID tag is mounted on a metal surface, for example, it is possible to improve the communication distance communicable between the RFID tag and the tag reader (not illustrated) or the tag writer (not illustrated).

In addition, because the folded parts of the metal layer 6 hold both ends of the core 1, the insulator layer 4, or the like, even in a case in which the entire RFID tag is bent when mounting the RFID tag on a curved surface, for example, it was confirmed that the insulator layer 4, the metal layer 6, or the like of the RFID tag do not separate from the core 1, and that wrinkles or cracks are uneasily formed in the RFID tag. Moreover, even in a case in which the RFID tag illustrated in FIG. 3D is mounted on a curved surface having a radius of curvature that is 15 mm, for example, using an adhesive tape for the adhesive layer 13, or the protection layer 12 of the RFID tag illustrated in FIG. 3C is mounted on the curved surface having the radius of curvature that is 15 mm, for example, using an adhesive tape, it was confirmed that the RFID tag is uneasily broken or damaged. Hence, it was confirmed that the RFID tag is suited for mounting on the curved surface.

Fourth Embodiment

Next, a description will be given of the manufacturing method of the RFID tag in a fourth embodiment, by referring to FIGS. 4A through 4D. FIGS. 4A through 4D are cross sectional views for explaining the manufacturing method of the RFID tag in the fourth embodiment. In FIGS. 4A through 4D, those parts that are the same as those corresponding parts in FIGS. 1A through 1D are designated by the same reference numerals, and a description thereof will be omitted.

Figure 4A:
FIGS. 4A, 4B, 4C, and 4D are cross sectional views for explaining the manufacturing method of the RFID tag in a fourth embodiment.
Figure 4B:
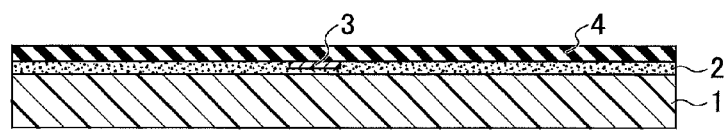
Figure 4C:
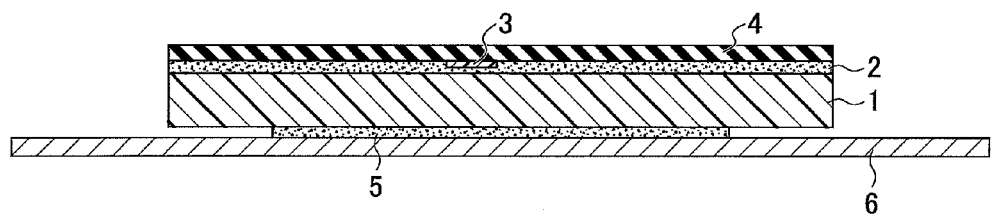
Figure 4D:
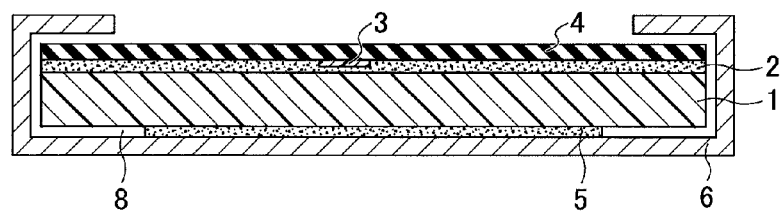

In this embodiment, as illustrated in FIG. 4C, a length of the adhesive layer 5 in the horizontal direction is shorter than a length of the metal layer in the horizontal direction. For this reason, as illustrated in FIG. 4D, when the adhesive layer 5 and the metal layer 6 are folded at both end parts of the core 1, a gap 8 is formed by the core 1, the metal layer 6, and the insulator layer 4 at both the end parts of the core 1. This gap 8 is formed at the end parts of the core 1, between the lower surface of the core 1 and the metal layer 6, between the side surface of the core 1 and the metal layer 6, and between the upper surface of the insulator layer 4 and the metal layer 6. Both end parts of the adhesive layer 5 are adhered on the upper surface of the insulator layer 4. The RFID tag illustrated in FIG. 4D can be made thin because the thicknesses of the adhesive layers 2 and 5 are slightly reduced during the curing, and the thickness of the RFID tag is 1.745 mm, for example. In addition, the cost and the weight of the RFID tag can also be reduced.

At the folded parts where the metal layer 6 is folded in the horizontal U-shape at both end parts of the core 1, the metal layer 6 and the dipole antenna formed by the pattern of the metal layer on the insulator layer 4 overlap, to form a loop-shaped antenna. Hence, even in a case in which the RFID tag is mounted on a metal surface, for example, it is possible to improve the communication distance communicable between the RFID tag and the tag reader (not illustrated) or the tag writer (not illustrated).

In addition, because the folded parts of the metal layer 6 hold both ends of the core 1, the insulator layer 4, or the like, and a part of a distortion of the core 1 when the RFID tag is bent is absorbed by the gap 8, even in a case in which the entire RFID tag is bent when mounting the RFID tag on a curved surface, for example, it was confirmed that the insulator layer 4, the metal layer 6, or the like of the RFID tag do not separate from the core 1, and that wrinkles or cracks are uneasily formed in the RFID tag. Moreover, even in a case in which a lower surface of the RFID tag illustrated in FIG. 4D is mounted on a curved surface having a radius of curvature that is 15 mm, for example, using an adhesive tape, it was confirmed that the RFID tag is uneasily broken or damaged. Hence, it was confirmed that the RFID tag is suited for mounting on the curved surface.

Fifth Embodiment

Next, a description will be given of the manufacturing method of the RFID tag in a fifth embodiment, by referring to FIGS. 5A through 5D. FIGS. 5A through 5D are cross sectional views for explaining the manufacturing method of the RFID tag in the fifth embodiment. In FIGS. 5A through 5D, those parts that are the same as those corresponding parts in FIGS. 2A through 2D are designated by the same reference numerals, and a description thereof will be omitted.

Figure 5A:
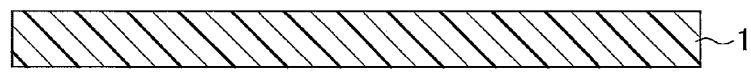
FIGS. 5A, 5B, 5C, and 5D are cross sectional views for explaining the manufacturing method of the RFID tag in a fifth embodiment.
Figure 5B:
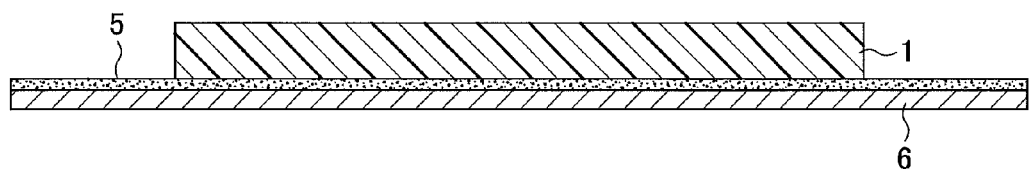
Figure 5C:
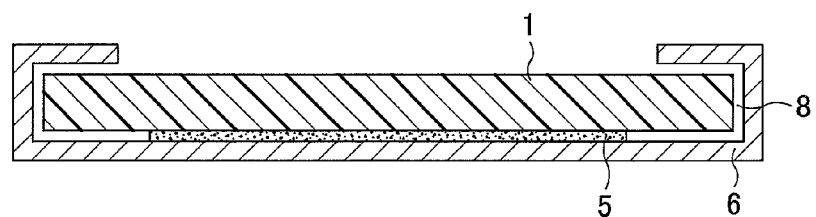
Figure 5D:
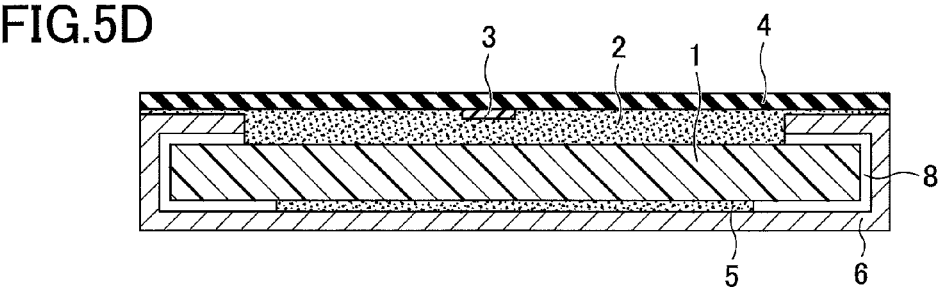

In this embodiment, as illustrated in FIG. 5C, the length of the adhesive layer 5 in the horizontal direction is shorter than the length of the metal layer in the horizontal direction. For this reason, as illustrated in FIG. 5D, when the adhesive layer 5 and the metal layer 6 are folded at both end parts of the core 1, the gap 8 is formed by the core 1, the metal layer 6, and the insulator layer 4 at both the end parts of the core 1. This gap 8 is formed at the end parts of the core 1, between the lower surface of the core 1 and the metal layer 6, between the side surface of the core 1 and the metal layer 6, and between the upper surface of the core 1 and the metal layer 6. Both end parts of the adhesive layer 5 are adhered on the upper surface of the insulator layer 4. The RFID tag illustrated in FIG. 5D can be made thin because the thicknesses of the adhesive layers 2 and 5 are slightly reduced during the curing, and the thickness of the RFID tag is 1.745 mm, for example. In addition, the cost and the weight of the RFID tag can also be reduced.

At the folded parts where the metal layer 6 is folded in the horizontal U-shape at both end parts of the core 1, the metal layer 6 and the dipole antenna formed by the pattern of the metal layer on the insulator layer 4 overlap, to form a loop-shaped antenna. Hence, even in a case in which the RFID tag is mounted on a metal surface, for example, it is possible to improve the communication distance communicable between the RFID tag and the tag reader (not illustrated) or the tag writer (not illustrated).

In addition, because the folded parts of the metal layer 6 hold both ends of the core 1 or the like, and a part of a distortion of the core 1 when the RFID tag is bent is absorbed by the gap 8, even in a case in which the entire RFID tag is bent when mounting the RFID tag on a curved surface, for example, it was confirmed that the insulator layer 4, the metal layer 6, or the like of the RFID tag do not separate from the core 1, and that wrinkles or cracks are uneasily formed in the RFID tag. Moreover, even in a case in which the lower surface of the RFID tag illustrated in FIG. 5D is mounted on a curved surface having a radius of curvature that is 15 mm, for example, using an adhesive tape, it was confirmed that the RFID tag is uneasily broken or damaged. Hence, it was confirmed that the RFID tag is suited for mounting on the curved surface.

Sixth Embodiment

Next, a description will be given of the manufacturing method of the RFID tag in a sixth embodiment, by referring to FIGS. 6A through 6D. FIGS. 6A through 6D are cross sectional views for explaining the manufacturing method of the RFID tag in the sixth embodiment. In FIGS. 6A through 6D, those parts that are the same as those corresponding parts in FIGS. 1A through 1D are designated by the same reference numerals, and a description thereof will be omitted. In this embodiment, parts of the RFID tag other than a mounting surface are covered by a protection member, to protect the RFID tag from a temperature environment, a humidity environment, a vibration environment, shock, or the like.

Figure 6A:
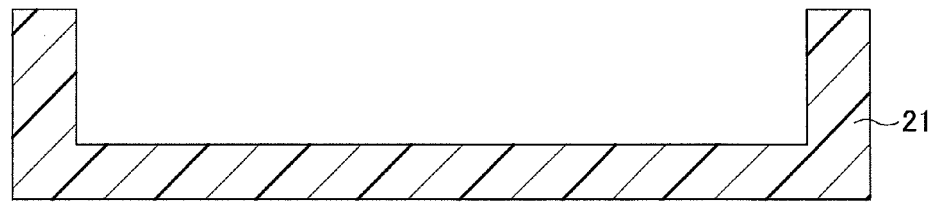
FIGS. 6A, 6B, 6C, and 6D are cross sectional views for explaining the manufacturing method of the RFID tag in a sixth embodiment.
Figure 6B:
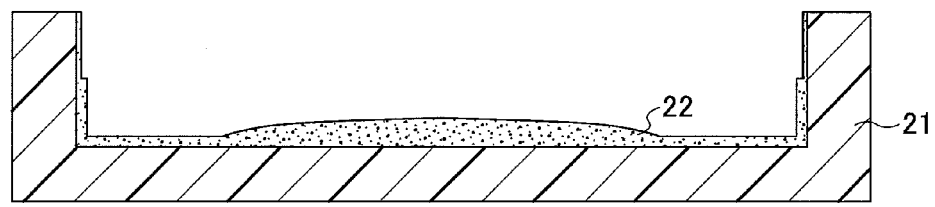

First, as illustrated in FIG. 6A, a box-shaped protection member 21 is prepared, and as illustrated in FIG. 68B, an adhesive agent 22 is coated on an inner part of the protection member 21. The protection member 21 is formed by an elastomer, such as silicone rubber or the like, having a thickness of 0.40 mm, for example. The protection member 21 may have a thickness in a range of 0.20 mm to 0.40 nm, for example. The adhesive agent 22 is not limited to a particularly adhesive agent as long as the adhesive agent has elasticity after curing, and may be RTV (Room Temperature Vulcanization) silicone rubber or the like, for example.

Figure 6C:
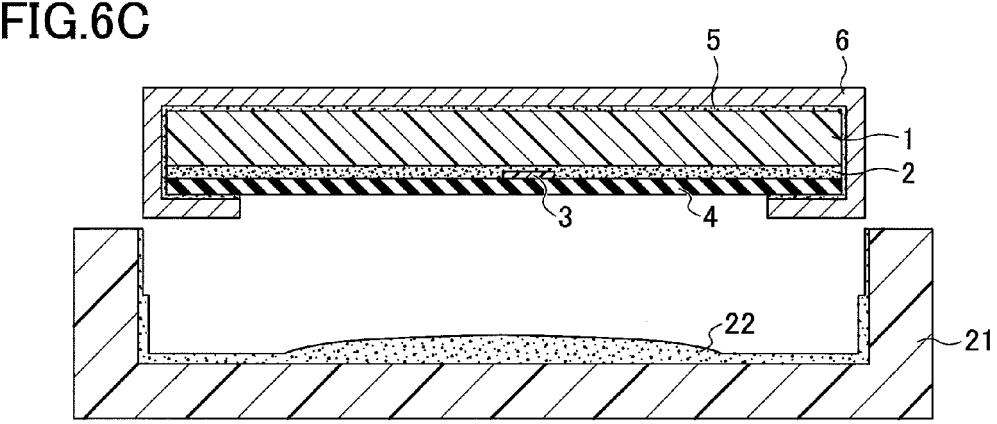
Figure 6D:
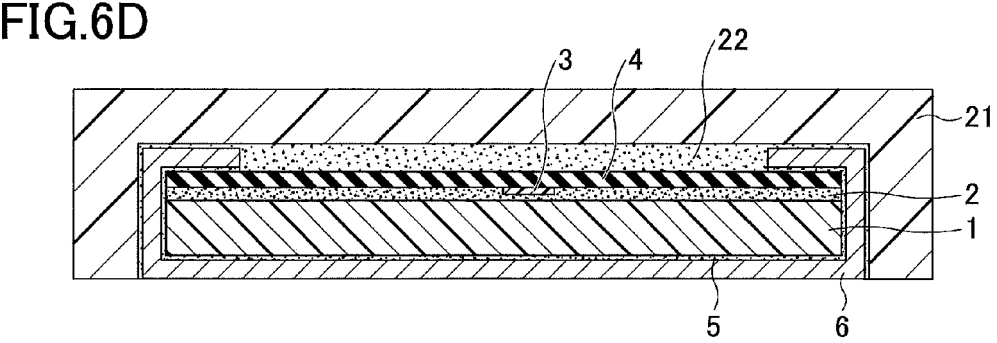

Next, as illustrated in FIG. 6C, the RFID tag in the first embodiment illustrated in FIG. 1D is turned upside-down, to insert the RFID tag from the side of the insulator layer 4 into an inner side the protection member 21. Accordingly, as illustrated in FIG. 6D in which the RFID tag is further turned upside-down, the folded parts of the insulator layer 4 and the metal layer 6 of the RFID tag are adhered to the protection member 21 by the adhesive agent 22. In FIG. 6D, the lower surface of the protection member 21 and the exposed lower surface of the metal layer 6 of the RFID tag lie approximately on the same plane, and may be mounted on a tag mounting surface, such as a curved surface or the like, using an adhesive tape. The thickness of the RFID tag illustrated in FIG. 6D, including the protection member 21, is 2.145 mm, for example.

At the folded parts where the metal layer 6 is folded in the horizontal U-shape at both end parts of the core 1, the metal layer 6 and the dipole antenna formed by the pattern of the metal layer on the insulator layer 4 overlap, to form a loop-shaped antenna. Hence, even in a case in which the RFID tag is mounted on a metal surface, for example, it is possible to improve the communication distance communicable between the RFID tag and the tag reader (not illustrated) or the tag writer (not illustrated).

In addition, because the folded parts of the metal layer 6 hold both ends of the core 1, the insulator layer 4, or the like, and the folded parts are held by the protection member 21, even in a case in which the entire RFID tag is bent when mounting the RFID tag on a curved surface, for example, it was confirmed that the insulator layer 4, the metal layer 6, or the like of the RFID tag do not separate from the core 1, and that wrinkles or cracks are uneasily formed in the RFID tag. Moreover, even in a case in which the lower surface of the protection member 21 and the exposed lower surface of the metal layer 6 of the RFID tag illustrated in FIG. 6D are mounted on a curved surface having a radius of curvature that is 15 mm, for example, using an adhesive tape, it was confirmed that the RFID tag is uneasily broken or damaged. Hence, it was confirmed that the RFID tag is suited for mounting on the curved surface. Furthermore, it was confirmed that the RFID tag is protected by the protection member 21 from the temperature environment, the humidity environment, the vibration environment, the shock, or the like.

Instead of inserting the RFID tag illustrated in FIG. 1D, the RFID tag illustrated in FIG. 2D may be inserted from the side of the insulator layer 4 into the inner side of the protection member 21, the RFID tag illustrated in FIG. 3D may be inserted from the side of the protection layer 12 into the inner side of the protection member 21, the RFID tag illustrated in FIG. 4D may be inserted from the side of the insulator layer 4 into the inner side of the protection member 21, and the RFID tag illustrated in FIG. 5D may be inserted from the side of the insulator layer 4 into the inner side the protection member 21.

Seventh Embodiment

Next, a description will be given of the manufacturing method of the RFID tag in a seventh embodiment, by referring to FIGS. 7A through 7D. FIGS. 7A through 7D are cross sectional views for explaining the manufacturing method of the RFID tag in the seventh embodiment. In FIGS. 7A through 7D, those parts that are the same as those corresponding parts in FIGS. 1A through 1D are designated by the same reference numerals, and a description thereof will be omitted. In this embodiment, the entire surface of the RFID tag is covered by protection members, and a filler material fills a gap between the RFID tag and the protection members, to protect the RFID tag from the temperature environment, the humidity environment, the vibration environment, the shock, or the like.

Figure 7A:
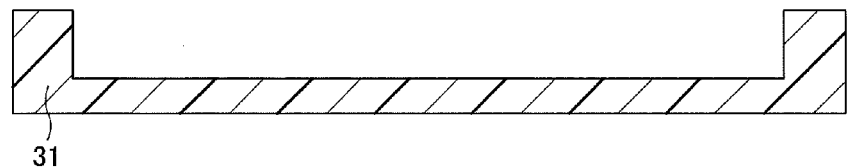
FIGS. 7A, 7B, 7C, and 7D are cross sectional views for explaining the manufacturing method of the RFID tag in a seventh embodiment.
Figure 7B:
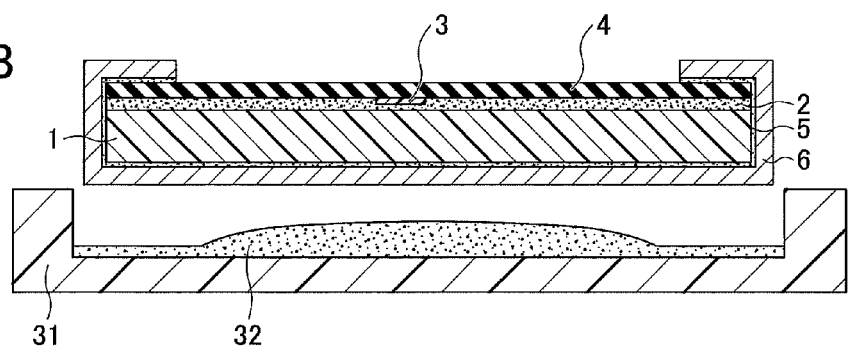

First, as illustrated in FIG. 7A, a box-shaped protection member 31 is prepared, and as illustrated in FIG. 7B, an adhesive agent 32 is coated on an inner part of the protection member 31. The protection member 31 is formed by an elastomer, such as silicone rubber or the like, having a thickness of 0.40 mm, for example. The protection member 31 may have a thickness in a range of 0.20 mm to 0.40 mm, for example. The adhesive agent 32 is not limited to a particularly adhesive agent as long as the adhesive agent has elasticity after curing, and may be RTV silicone rubber or the like, for example.

Figure 7C:
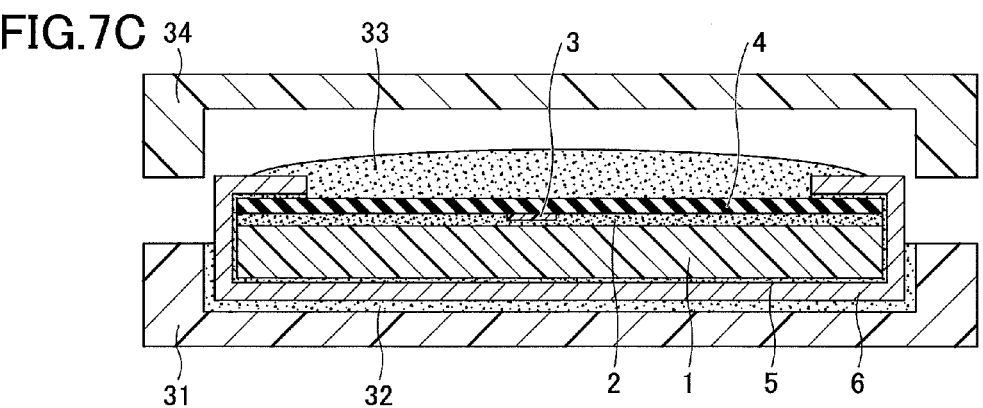
Figure 7D:
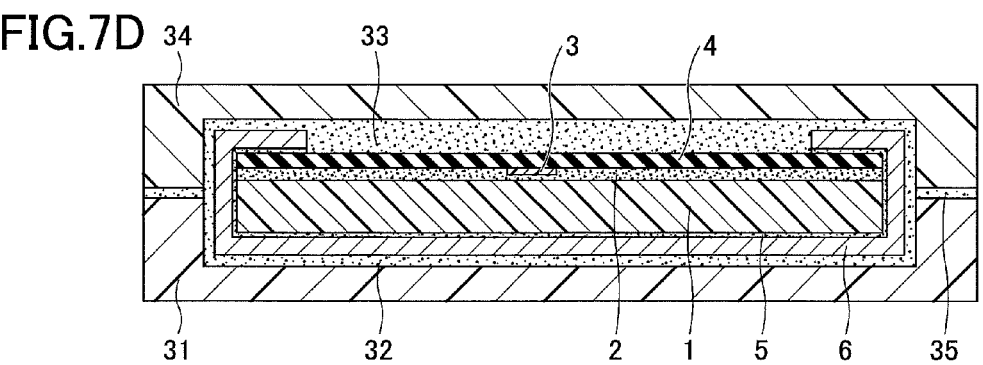

Next, as illustrated in FIGS. 7B and 7C, the RFID tag in the first embodiment illustrated in FIG. 1D is inserted from the side of the metal layer 6 into an inner side the protection member 31. Accordingly, as illustrated in FIG. 7C, the metal layer 6 of the RFID tag is adhered on the protection member 31 by the adhesive agent 32. In addition, as illustrated in FIG. 7C, an adhesive agent 33 is coated on the upper surface of the RFID tag, and a box-shaped protection member 34 is adhered on the RFID tag and the protection member 31 via the adhesive agent 33. The protection member 34 may be made of the same material as the protection member 31, and have the same thickness as the protection member 31. The adhesive agent 33 may be made of the same material as the adhesive agent 32. The protection members 31 and 34 that are mutually adhered form a package or a casing that protects the RFID tag. An adhesive agent 35 at the parts connecting the protection members 31 and 34 may be any of the adhesive agent 32, the adhesive agent 33, a mixture of the adhesive agents 32 and 33, and an adhesive agent other than the adhesive agents 32 and 33. Accordingly, as illustrated in FIG. 7D, the RFID tag is encapsulated by the protection members 31 and 34, and a space between the RFID tag and the protection members 31 and 34 is filled by the adhesive agents 32 and 33 that also function as a filler material. The adhesive agents 32 and 33 that function as the filler material can suppress a change in shape of the RFID tag encapsulated within the protection members 31 and 34, particularly due to a change in pressure. In FIG. 7D, the RFID tag may be mounted on the tag mounting surface, such as a curved surface or the like, by mounting a lower surface of the protection member 31 on the tag mounting surface using an adhesive tape. The thickness of the RFID tag, including the protection members 31 and 34 illustrated in FIG. 7D, is 2.590 mm, for example.

At the folded parts where the metal layer 6 is folded in the horizontal U-shape at both end parts of the core 1, the metal layer 6 and the dipole antenna formed by the pattern of the metal layer on the insulator layer 4 overlap, to form a loop-shaped antenna. Hence, even in a case in which the RFID tag is mounted on a metal surface, for example, it is possible to improve the communication distance communicable between the RFID tag and the tag reader (not illustrated) or the tag writer (not illustrated).

In addition, because the folded parts of the metal layer 6 hold both ends of the core 1, the insulator layer 4, or the like, and the folded parts are held by the protection members 31 and 34, even in a case in which the entire RFID tag is bent when mounting the RFID tag on a curved surface, for example, it was confirmed that the insulator layer 4, the metal layer 6, or the like of the RFID tag do not separate from the core 1, and that wrinkles or cracks are uneasily formed in the RFID tag. Moreover, even in a case in which the lower surface of the protection member 21 of the RFID tag illustrated in FIG. 7D is mounted on a curved surface having a radius of curvature that is 15 mm, for example, using an adhesive tape, it was confirmed that the RFID tag is uneasily broken or damaged. Hence, it was confirmed that the RFID tag is suited for mounting on the curved surface. Furthermore, it was confirmed that the RFID tag is protected by the protection members 31 and 34 from the temperature environment, the humidity environment, the vibration environment, the shock, or the like.

Instead of inserting the RFID tag illustrated in FIG. 1D, the RFID tag illustrated in FIG. 2D may be inserted from the side of the metal layer 6 into the inner side of the protection member 31, and the RFID tag illustrated in FIG. 3D may be inserted from the side of the metal layer 6 into the inner side of the protection member 31. In addition, the RFID tag illustrated in FIG. 1D may be inserted from the side of the insulator layer 4 into the inner side of the protection member 31. Similarly, instead of inserting the RFID tag illustrated in FIG. 1D, the RFID tag illustrated in FIG. 2D may be inserted from the side of the insulator layer 4 into the inner side of the protection member 31, and the RFID tag illustrated in FIG. 3D may be inserted from the side of the protection layer 12 into the inner side of the protection member 31.

In addition, the RFID tag may first be inserted into the protection member 34, and the protection member 31 may thereafter be connected to the protection member 34. Moreover, instead inserting the RFID tag illustrated in FIG. 1D, the RFID tag illustrated in FIG. 2D or illustrated in FIG. 3D may be inserted in a similar manner.

Furthermore, although depths of the inner parts of the protection members 31 and 34 are approximately the same in the example illustrated in FIGS. 7A through 7D, the depth of one of the protection members 31 and 34 may of course be deeper than the other.

Eighth Embodiment

Next, a description will be given of the manufacturing method of the RFID tag in an eighth embodiment, by referring to FIGS. 8A through 8D. FIGS. 8A through 8D are cross sectional views for explaining the manufacturing method of the RFID tag in the eighth embodiment. In FIGS. 8A through 8D, those parts that are the same as those corresponding parts in FIGS. 7A through 7D are designated by the same reference numerals, and a description thereof will be omitted. In this embodiment, the entire surface of the RFID tag is covered by protection members, and a gap is maintained between the RFID tag and the protection members, to protect the RFID tag from the temperature environment, the humidity environment, the vibration environment, the shock, or the like.

Figure 8A:
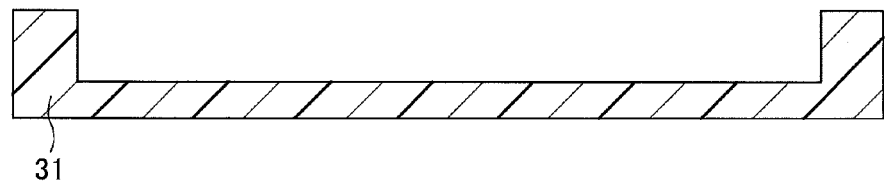
FIGS. 8A, 8B, 8C, and 8D are cross sectional views for explaining the manufacturing method of the RFID tag in an eighth embodiment.

First, as illustrated in FIG. 8A, the box-shaped protection member 31 is prepared.

Figure 8B:
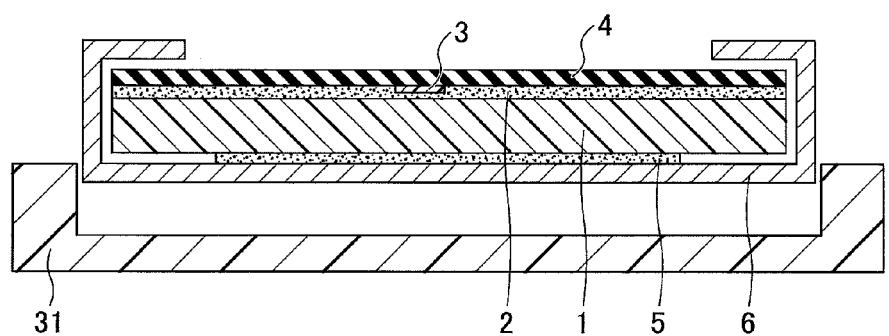
Figure 8C:
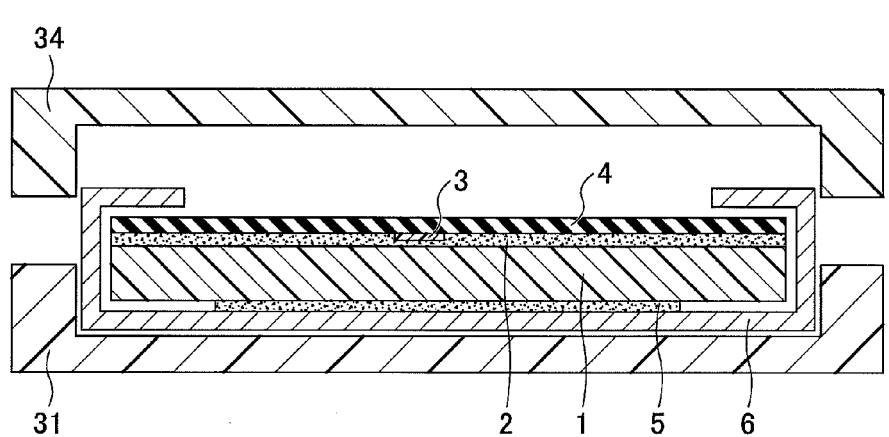
Figure 8D:
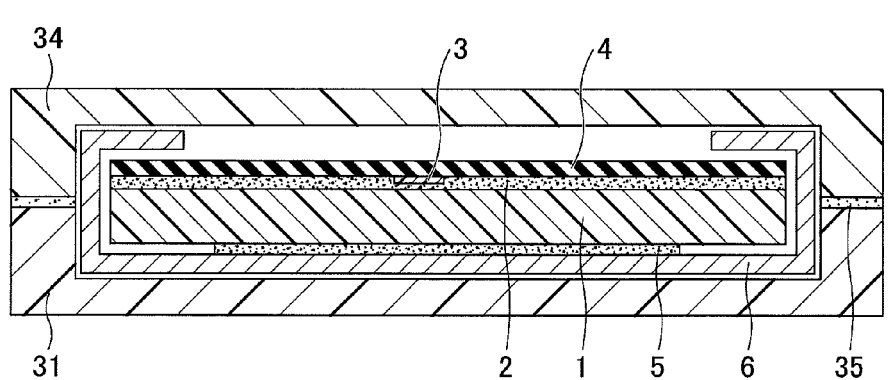

Next, as illustrated in FIG. 8B, the RFID tag in the fourth embodiment illustrated in FIG. 4D is inserted from the side of the metal layer 6 into the inner part of the protection member 31, as illustrated in FIG. 8C. In addition, as illustrated in FIG. 8C, the RFID tag and the protection member 31 are covered by the box-shaped protection member 34, and the protection members 31 and 34 are adhered by the adhesive agent 35. As a result, as illustrated in FIG. 8D, the RFID tag is encapsulated by the protection members 31 and 34, and the space between the RFID tag and the protection members 31 and 34 is maintained. In FIG. 8D, the RFID tag may be mounted on the tag mounting surface, such as a curved surface or the like, by mounting the lower surface of the protection member 31 using an adhesive tape. The thickness of the RFID tag, including the protection members 31 and 34 illustrated in FIG. 8D, is 2.590 mm, for example.

At the folded parts where the metal layer 6 is folded in the horizontal U-shape at both end parts of the core 1, the metal layer 6 and the dipole antenna formed by the pattern of the metal layer on the insulator layer 4 overlap, to form a loop-shaped antenna. Hence, even in a case in which the RFID tag is mounted on a metal surface, for example, it is possible to improve the communication distance communicable between the RFID tag and the tag reader (not illustrated) or the tag writer (not illustrated).

In addition, because the folded parts of the metal layer 6 hold both ends of the core 1, the insulator layer 4, or the like, and a part of the distortion of the core 1 when the RFID tag is bent is absorbed by the gap 8 and the gap between the RFID tag and the protection members 31 and 34, even in a case in which the entire RFID tag is bent when mounting the RFID tag on a curved surface, for example, it was confirmed that the insulator layer 4, the metal layer 6, or the like of the RFID tag do not separate from the core 1, and that wrinkles or cracks are uneasily formed in the RFID tag. Moreover, even in a case in which the entire RFID tag is bent when mounting the RFID tag on a curved surface, for example, it was confirmed that the insulator layer 4, the metal layer 6, or the like of the RFID tag do not separate from the core 1, and that wrinkles or cracks are uneasily formed in the RFID tag. Furthermore, even in a case in which the lower surface of the protection member 31 of the RFID tag illustrated in FIG. 8D is mounted on a curved surface having a radius of curvature that is 15 mm, for example, using an adhesive tape, it was confirmed that the RFID tag is uneasily broken or damaged. Hence, it was confirmed that the RFID tag is suited for mounting on the curved surface. In addition, it was confirmed that the RFID tag is protected by the protection members 31 and 34 from the temperature environment, the humidity environment, the vibration environment, the shock, or the like. In the case of this embodiment, it is possible to reduce the weight of the RFID tag including the protection members 31 and 34 when compared to the seventh embodiment described above, because this embodiment does not use a filler material to fill the gap.

Instead of inserting the RFID tag illustrated in FIG. 4D, the RFID tag illustrated in FIG. 5D may be inserted from the side of the metal layer 6 into the inner side of the protection member 31. In addition, the RFID tag illustrated in FIG. 4D may be inserted from the side of the insulator layer 4 into the inner side of the protection member 31. Similarly, instead of inserting the RFID tag illustrated in FIG. 4D, the RFID tag illustrated in FIG. 5D may be inserted from the side of the insulator layer 4 into the inner side of the protection member 31.

In addition, the RFID tag may first be inserted into the protection member 34, and the protection member 31 may thereafter be connected to the protection member 34. Moreover, instead inserting the RFID tag illustrated in FIG. 4D, the RFID tag illustrated in FIG. 5D may be inserted in a similar manner.

Furthermore, although depths of the inner parts of the protection members 31 and 34 are approximately the same in the example illustrated in FIGS. 8A through 8D, the depth of one of the protection members 31 and 34 may of course be deeper than the other. In a case in which the RFID tag does not need to be completely encapsulated by the protection members 31 and 34, the adhesive agent 35 may be intermittently coated, to form an opening communicating a space surrounded by the protection members 31 and 34 to an outside of the protection members 31 and 34.

Figure 9:
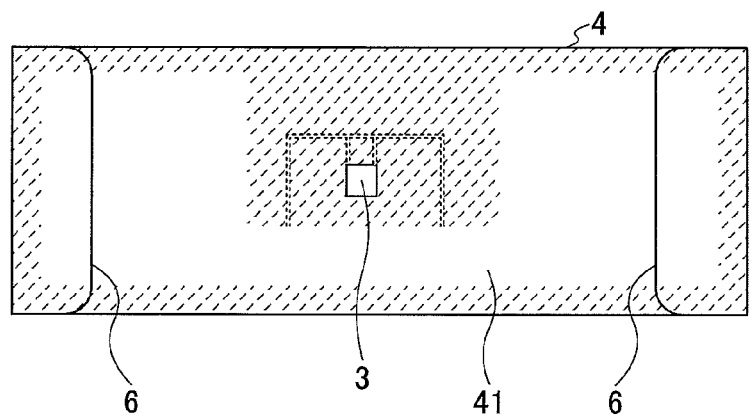
FIG. 9 is a plan view, partially in a perspective, of the RFID tag in the eighth embodiment.

FIG. 9 is a plan view, partially in a perspective, of the RFID tag in the eighth embodiment. For the sake of convenience, FIG. 9 illustrates the RFID tag in a state in which the protection members 31 and 34 are removed. As illustrated in FIG. 9, a pattern 41 of a metal layer is formed on a surface (lower side of paper in FIG. 9) of the insulator layer 4 on the side of the core 1. The shape of the pattern 41 of the metal layer is not limited to a particular shape as long as the pattern 41 is able to form a dipole antenna. Terminals of the tag chip 3 that is indicated by a solid line for the sake of convenience to facilitate visual confirmation are electrically connected to the pattern 41 of the metal layer. The metal layer 6 and a part of the pattern 41 of the metal layer on the insulator layer 4 overlap at the folded parts of the metal layer 6.

The pattern of the metal layer formed on the insulator layer 4 in the first through eighth embodiments described above may be similar to the pattern 41 of the metal layer illustrated in FIG. 9.

Ninth Embodiment

Figure 10:
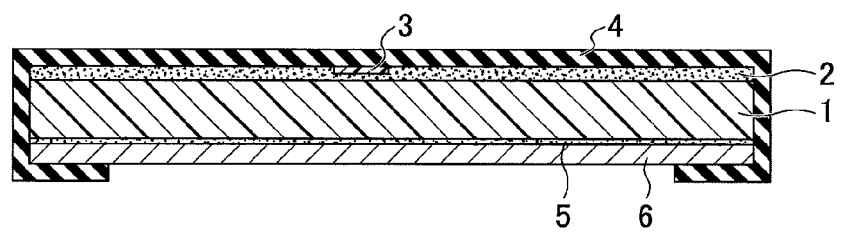
FIG. 10 is a cross sectional view for explaining the manufacturing method of the RFID tag in a ninth embodiment.

FIG. 10 is a cross sectional view for explaining the manufacturing method of the RFID tag in a ninth embodiment. In FIG. 10, those parts that are the same as those corresponding parts in FIGS. 1A through 1D are designated by the same reference numerals, and a description thereof will be omitted. In this embodiment, the insulator layer 4 is folded at both end parts of the core 1. In this example, the insulator layer 4 is once bent in a vertical direction (downward direction) along the end parts of the core 1, and is further bent in a horizontal direction (that is, in a direction towards the central part of the core 1) along the lower surface of the metal layer 6. In other words, the insulator layer 4 is folded in a horizontal U-shape at both end parts of the core 1. The adhesive layer 2 and the insulator layer 4 may have approximately the same sizes, so that the insulator layer 4 is adhered to the side surface of the core 1 and the lower surface of the metal layer 6 via the adhesive layer 2. The RFID tag illustrated in FIG. 10 can be made thin because the thicknesses of the adhesive layers 2 and 5 are slightly reduced during the curing, and the thickness of the RFID tag is 1.505 mm, for example. In addition, the cost and the weight of the RFID tag can also be reduced.

At the folded parts where the insulator layer 4 is folded in the horizontal U-shape at both end parts of the core 1, the metal layer 6 and the dipole antenna formed by the pattern of the metal layer on the insulator layer 4 overlap, to form a loop-shaped antenna. Hence, even in a case in which the RFID tag is mounted on a metal surface, for example, it is possible to improve the communication distance communicable between the RFID tag and the tag reader (not illustrated) or the tag writer (not illustrated).

In addition, in order to provide the gap 8 such as that illustrated in FIGS. 5C and 5D at the folded parts of the insulator layer 4, it is possible not to form the adhesive layers 2 and 5 on the entire upper surface and lower surface of the core 1, or on the side surfaces of the core 1. In this case, because the insulator layer 4 holds both ends of the core 1 or the like, and a part of a distortion of the core 1 when the RFID tag is bent is absorbed by the gap 8, even in a case in which the entire RFID tag is bent when mounting the RFID tag on a curved surface, for example, it was confirmed that the insulator layer 4, the metal layer 6, or the like of the RFID tag do not separate from the core 1, and that wrinkles or cracks are uneasily formed in the RFID tag. Moreover, even in a case in which the lower surface of the RFID tag illustrated in FIG. 10 is mounted on a curved surface having a radius of curvature that is 15 mm, for example, using an adhesive tape, it was confirmed that the RFID tag is uneasily broken or damaged. Hence, it was confirmed that the RFID tag is suited for mounting on the curved surface.

The protection layer 12 may be formed on the lower surface of the RFID tag illustrated in FIG. 10 via the adhesive layer 11 similar to that of FIGS. 3A through 3D.

Tenth Embodiment

Figure 11:
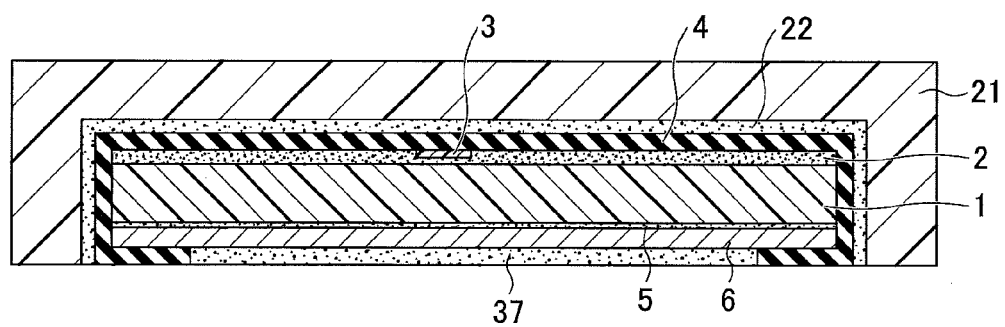
FIG. 11 is a cross sectional view for explaining the manufacturing method of the RFID tag in a tenth embodiment.

FIG. 11 is a cross sectional view for explaining the manufacturing method of the RFID tag in a tenth embodiment. In FIG. 11, those parts that are the same as those corresponding parts in FIGS. 6A through 6D, and FIG. 10 are designated by the same reference numerals, and a description thereof will be omitted. In this embodiment, an RFID tag having a configuration similar to that of FIG. 10 has the protection member 21 adhered thereon by the adhesive agent 22. In addition, an adhesive layer 37 is adhered on the folded parts of the insulator layer 4 and the exposed lower surface of the metal layer 6. The thickness of the RFID tag including the protection member 21 illustrated in FIG. 11 is 1.895 mm, for example.

At the folded parts where the insulator layer 4 is folded in the horizontal U-shape at both end parts of the core 1, the metal layer 6 and the dipole antenna formed by the pattern of the metal layer on the insulator layer 4 overlap, to form a loop-shaped antenna. Hence, even in a case in which the RFID tag is mounted on a metal surface, for example, it is possible to improve the communication distance communicable between the RFID tag and the tag reader (not illustrated) or the tag writer (not illustrated).

In addition, because the folded parts of the insulator layer 4 hold both ends of the core 1, the insulator layer 4, or the like, and the folded parts are held by the protection member 21, even in a case in which the entire RFID tag is bent when mounting the RFID tag on a curved surface, for example, it was confirmed that the insulator layer 4, the metal layer 6, or the like of the RFID tag do not separate from the core 1, and that wrinkles or cracks are uneasily formed in the RFID tag. Moreover, even in a case in which the lower surface of the protection member 21 and the exposed lower surface of the metal layer 6 of the RFID tag illustrated in FIG. 11 are mounted on a curved surface having a radius of curvature that is 15 mm, for example, using an adhesive tape, it was confirmed that the RFID tag is uneasily broken or damaged. Hence, it was confirmed that the RFID tag is suited for mounting on the curved surface. Furthermore, it was confirmed that the RFID tag is protected by the protection member 21 from the temperature environment, the humidity environment, the vibration environment, the shock, or the like.

Eleventh Embodiment

Figure 12:
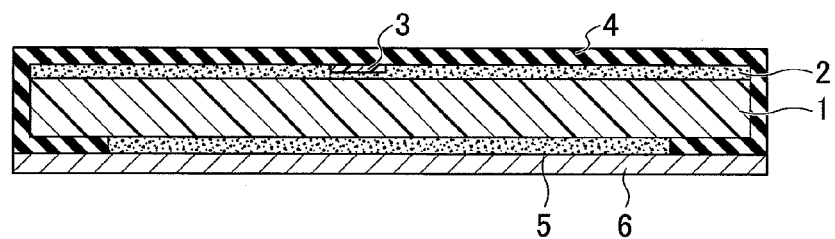
FIG. 12 is a cross sectional view for explaining the manufacturing method of the RFID tag in an eleventh embodiment.

FIG. 12 is a cross sectional view for explaining the manufacturing method of the RFID tag in an eleventh embodiment. In FIG. 12, those parts that are the same as those corresponding parts in FIGS. 1A through 1D are designated by the same reference numerals, and a description thereof will be omitted. In this embodiment, the insulator layer 4 is folded at both end parts of the core 1. In this example, the insulator layer 4 is once bent in a vertical direction (downward direction) along the end parts of the core 1, and is further bent in a horizontal direction (that is, in a direction towards the central part of the core 1) along the lower surface of the core 1. In other words, the insulator layer 4 is folded in a horizontal U-shape at both end parts of the core 1. The adhesive layer 2 and the insulator layer 4 may have approximately the same sizes, so that the insulator layer 4 is adhered to the side surface of the core 1 and a part of the lower surface of the core 1 via the adhesive layer 2. The metal layer 6 is adhered on the folded parts of the insulator layer 4 and the exposed lower surface of the core 1 via the adhesive layer 5. The adhesive layer 5 may also be provided between the metal layer 6 and the folded parts of the insulator layer 4. The RFID tag illustrated in FIG. 12 can be made thin because the thicknesses of the adhesive layers 2 and 5 are slightly reduced during the curing, and the thickness of the RFID tag is 1.505 mm, for example. In addition, the cost and the weight of the RFID tag can also be reduced.

At the folded parts where the insulator layer 4 is folded in the horizontal U-shape at both end parts of the core 1, the metal layer 6 and the dipole antenna formed by the pattern of the metal layer on the insulator layer 4 overlap, to form a loop-shaped antenna. Hence, even in a case in which the RFID tag is mounted on a metal surface, for example, it is possible to improve the communication distance communicable between the RFID tag and the tag reader (not illustrated) or the tag writer (not illustrated).

In addition, because the folded parts of the insulator layer 4 are held by the metal layer 6, even in a case in which the entire RFID tag is bent when mounting the RFID tag on a curved surface, for example, it was confirmed that the insulator layer 4, the metal layer 6, or the like of the RFID tag do not separate from the core 1, and that wrinkles or cracks are uneasily formed in the RFID tag. Moreover, even in a case in which the lower surface of the RFID tag illustrated in FIG. 12 is mounted on a curved surface having a radius of curvature that is 15 mm, for example, using an adhesive tape, it was confirmed that the RFID tag is uneasily broken or damaged. Hence, it was confirmed that the RFID tag is suited for mounting on the curved surface.

The RFID tag illustrated in FIG. 12 may be inserted into the protection member 21 illustrated in FIG. 11.

Twelfth Embodiment

Figure 13:
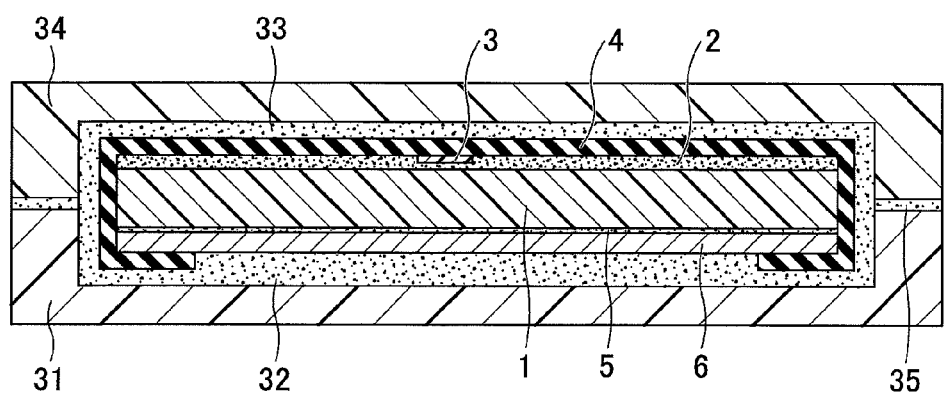
FIG. 13 is a cross sectional view for explaining the manufacturing method of the RFID tag in a twelfth embodiment.

FIG. 13 is a cross sectional view for explaining the manufacturing method of the RFID tag in a twelfth embodiment. In FIG. 13, those parts that are the same as those corresponding parts in FIGS. 7A through 7D, and FIG. 10 are designated by the same reference numerals, and a description thereof will be omitted. In this embodiment, an RFID tag having a configuration similar to that of FIG. 10 is encapsulated by the protection members 31 and 34, and the gap between the RFID tag and the protection members 31 and 34 is filled by the adhesive agents 32 and 33 that also function as the filler material. The adhesive agents 32 and 33 that function as the filler material can suppress a change in shape of the RFID tag encapsulated within the protection members 31 and 34, particularly due to a change in pressure.

The thickness of the RFID tag, including the protection members 31 and 34 illustrated in FIG. 13, is 2.35 mm, for example.

At the folded parts where the insulator layer 4 is folded in the horizontal U-shape at both end parts of the core 1, the metal layer 6 and the dipole antenna formed by the pattern of the metal layer on the insulator layer 4 overlap, to form a loop-shaped antenna. Hence, even in a case in which the RFID tag is mounted on a metal surface, for example, it is possible to improve the communication distance communicable between the RFID tag and the tag reader (not illustrated) or the tag writer (not illustrated).

In addition, because the folded parts of the insulator layer 4 hold both ends of the core 1, the metal layer 6, or the like, and the folded parts are held by the protection members 31 and 34, even in a case in which the entire RFID tag is bent when mounting the RFID tag on a curved surface, for example, it was confirmed that the insulator layer 4, the metal layer 6, or the like of the RFID tag do not separate from the core 1, and that wrinkles or cracks are uneasily formed in the RFID tag. Moreover, even in a case in which the lower surface of the protection member 21 of the RFID tag illustrated in FIG. 13 is mounted on a curved surface having a radius of curvature that is 15 mm, for example, using an adhesive tape, it was confirmed that the RFID tag is uneasily broken or damaged. Hence, it was confirmed that the RFID tag is suited for mounting on the curved surface. Furthermore, it was confirmed that the RFID tag is protected by the protection members 31 and 34 from the temperature environment, the humidity environment, the vibration environment, the shock, or the like.

Instead of inserting the RFID tag illustrated in FIG. 10, the RFID tag illustrated in FIG. 12 may be inserted from the side of the metal layer 6 into the inner side of the protection member 31. In addition, the RFID tag illustrated in FIG. 12 may be inserted from the side of the insulator layer 4 into the inner side of the protection member 31.

In addition, the RFID tag may first be inserted into the protection member 34, and the protection member 31 may thereafter be connected to the protection member 34. Moreover, instead inserting the RFID tag illustrated in FIG. 10, the RFID tag illustrated in FIG. 12 may be inserted in a similar manner.

Furthermore, although depths of the inner parts of the protection members 31 and 34 are approximately the same in the example illustrated in FIG. 13, the depth of one of the protection members 31 and 34 may of course be deeper than the other.

It is possible not to fill the space between the RFID tag and the protection members 31 and 34 by the filler material.

Figure 14:
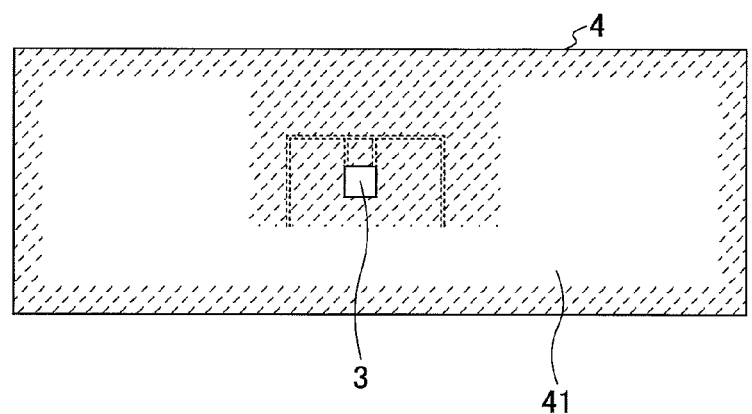
FIG. 14 is a plan view, partially in a perspective, of the RFID tag in the twelfth embodiment.

FIG. 14 is a plan view, partially in a perspective, of the RFID tag in the twelfth embodiment. For the sake of convenience, FIG. 14 illustrates the RFID tag in a state in which the protection members 31 and 34 are removed. As illustrated in FIG. 14, the pattern 41 of the metal layer is formed on the surface (lower side of paper in FIG. 14) of the insulator layer 4 on the side of the core 1. The shape of the pattern 41 of the metal layer is not limited to a particular shape as long as the pattern 41 is able to form a dipole antenna. Terminals of the tag chip 3 that is indicated by a solid line for the sake of convenience to facilitate visual confirmation are electrically connected to the pattern 41 of the metal layer.

The pattern of the metal layer formed on the insulator layer 4 in the ninth through eleventh embodiments described above may be similar to the pattern 41 of the metal layer illustrated in FIG. 14.

In each of the embodiments described above, it was confirmed that, by appropriately selecting the thicknesses of each of the layers, the thickness of the RFID tag using no protection member 21 or no protection members 31 and 34 can be reduced to approximately 1.0 mm. The RFID tag using no protection member 21 or no protection members 31 and 34 may be used in an interior environment (environment in which the temperature, the pressure, or the like are adjusted, as in the case of a cabin of an aircraft) of RTCA/DO-160, SAE/AS5678, or the like, for example, which are standards for the RFID tag. In addition, it was confirmed that the thickness of the RFID tag using the protection member 21 or the protection members 31 and 34 can be reduced to approximately 2.0 mm. The RFID tag using the protection member 21 or the protection members 31 and 34 may be used in an exterior environment (environment in which the temperature, the pressure, or the like are not adjusted, as in the case of a landing gear well of the aircraft) of RTCA/DO-160, SAE/AS5678, or the like, for example, which are standards for the RFID tag, and a power plant environment (high-temperature environment, such as a periphery of an engine of the aircraft).

Figure 15:
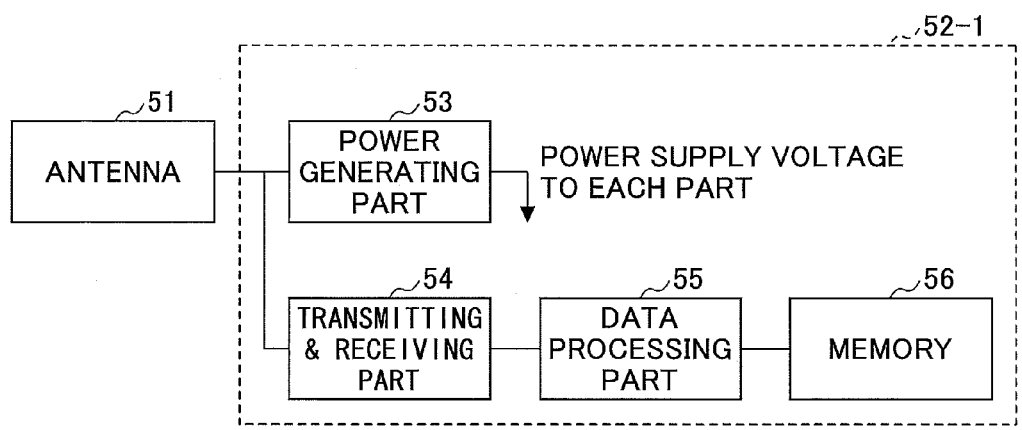
FIG. 15 is a block diagram illustrating an example of a hardware configuration of a passive type RFID tag.

Next, a description will be given of the configuration of the passive type RFID tag, by referring to FIG. 15. FIG. 15 is a block diagram illustrating an example of a hardware configuration of the passive type RFID tag. The passive type RFID tag illustrated in FIG. 15 includes a loop-shaped antenna 51 which is an example of the dipole antenna, and a tag chip 52-1 which is an example of the semiconductor chip. The tag chip 52-1 include a power generating part 53 which is an example of a power supply, a transmitting and receiving part 54 which is an example of a communication part, a data processing part 55, and a memory 56 which is an example of a storage part. The power generating part 53 generates, by a known method, a power supply voltage from radio waves received via the antenna 51, and supplies the power supply voltage to each part within the tag chip 52-1. For example, the transmitting and receiving part 54 may include a demodulator part that demodulates received data according to a modulation technique corresponding to a modulation technique of the tag writer (not illustrated), and a modulator that modules transmitting data according to a modulation technique corresponding to a modulation technique of the tag reader (not illustrated). The data processing part 55 performs a decoding process to subject the demodulated received data to a decoding corresponding to a coding technique of the tag writer, a coding process to subject the transmitting data to be modulated to a coding corresponding to a coding technique of the tag reader, a control process to control read and write of the data with respect to the memory 56, or the like. The data processing part 55 may include a codec that performs the decoding process and the coding process, and a controller that performs the control process. In addition, the data processing part 55 may include a processor, such as a CPU (Central Processing Unit), that performs the decoding process, the coding process, and the control process. The tag chip 52-1 is mounted at a central part of the surface of the core 1 provided with the metal layer or the dipole antenna, for example, using an adhesive agent or the like.

In the example illustrated in FIG. 15, the tag chip 52-1 may include one or a plurality of sensors 57. In a case in which the tag chip 52-1 includes the sensor 57, data related to information such as the temperature, the humidity, the pressure, or the like detected by the sensor 57 may be stored in the memory 56 together with time information such as the time, the date and time, or the like managed by the data processing part 55.

Figure 16:
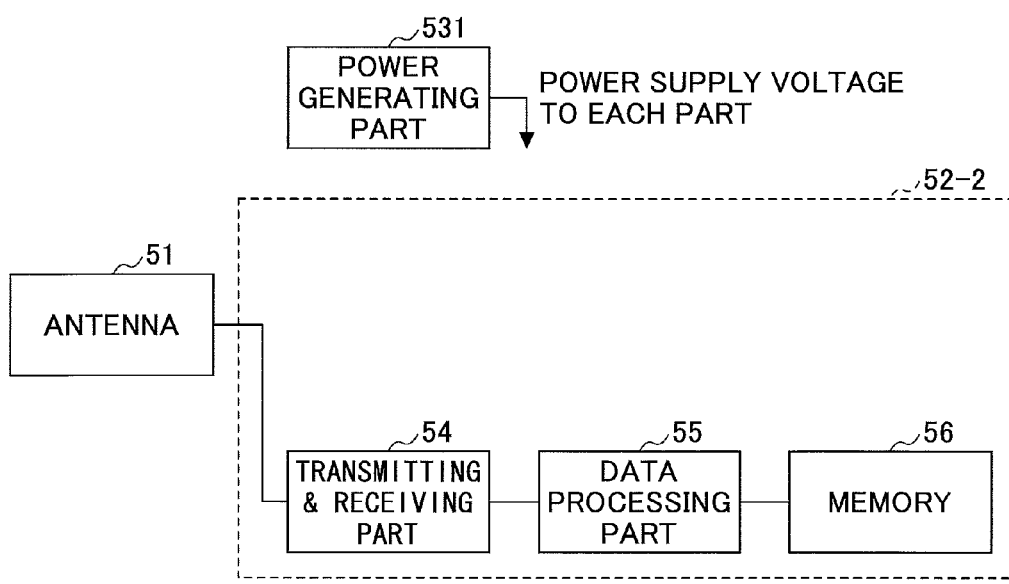
FIG. 16 is a block diagram illustrating an example of a hardware configuration of an active type RFID tag.

Next, a description will be given of the configuration of the active type RFID tag having a built-in battery, by referring to FIG. 16. FIG. 16 is a block diagram illustrating an example of a hardware configuration of the active type RFID tag. In FIG. 16, those parts that are the same as those corresponding parts in FIG. 15 are designated by the same reference numerals, and a description thereof will be omitted. The active type RFID tag illustrated in FIG. 16 includes the loop-shaped antenna 51, a tag chip 52-2, and a battery 531 which is an example of a power supply. The battery 531 supplies a power supply voltage to each part within the tag chip 52-2. The type of the battery 531 is not limited to a particular type, and the number of batteries 531 is not limited to a particular number. The tag chip 52-2 and the battery 531 are mounted at the central part of the surface of the core 1 provided with the metal layer or the dipole antenna, for example, using an adhesive agent or the like.

The RFID tag illustrated in FIG. 16 includes functions of the active type RFID tag, however, this RFID tag may form a semi-active type RFID tag that starts communication with a host system, for example, by a system similar to that of the passive type RFID tag.

The active type RFID tag and the semi-active type RFID tag is provided with the battery 531 in place of the power generating part 53, and differ from the passive type RFID tag in that this battery 531 is connected to the chip 52-2. However, the configuration of other parts of the active type RFID tag and the semi-active type RFID tag may be similar to that of the passive type RFID tag. Accordingly, in the first through twelfth embodiments described above in conjunction with FIGS. 1A through 14, the RFID tag may of course form the active type RFID tag or the semi-active type RFID tag by providing the battery 531 in place of the power generating part 53 and connecting this battery 531 to the tag chip 52-1 which corresponds to the tag chip 3.

The disclosed RFID tag is particularly suited for mounting on the curved surface, however, the surface on which the RFID tag is mounted is not limited to the curved surface, and the RFID tag may of course be mounted on a flat surface.

In addition, the shape of the RFID tag in the plan view is not limited to the rectangular shape, and the shape of the RFID tag may be selected arbitrarily according to the usage of the RFID tag.

Further, the RFID tag may be provided integrally On a rewritable RFID sheet, for example. In this case, because the RFID tag in the first through twelfth embodiments can be made thin, the RFID tag may be printed by a known RFID tag so that data related to log information, management information, or the like of the components, for example, are written into the memory of the RFID tag in a manner readable by the RFID tag reader, and character data related to the log information, the management information, or the like of the components are printed on the rewritable RFID sheet in a manner visible by a user.

In each of the embodiments described above, the metal layer and the dipole antenna overlap at the folded parts where one of the metal layer and the dipole antenna is folded at a pair of end parts, however, the overlapping parts of the metal layer and the dipole antenna may be adhered by an adhesive agent. In this case, the adhesive agent adhering the overlapping parts of the metal layer and the dipole antenna may be conductive or non-conductive.

According to the disclosed RFID tag and manufacturing method thereof, it is possible to provide an RFID tag having a loop-shaped antenna and suited for mounting on a curved surface.

Although the embodiments are numbered with, for example, "first," "second," . . . or "twelfth," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An RFID tag comprising:
a core formed by a first elastic material and having a first surface, a second surface on an opposite side of the first surface, and a pair of end parts provided on mutually opposite sides and connecting to the first surface and the second surface;
a first metal layer provided on the first surface;
a semiconductor chip provided on the second surface and having a communication part;
an insulator layer provided on the second surface and covering the semiconductor chip, the insulator layer having a third surface opposing the second surface and a fourth surface on an opposite side from the third surface; and
a dipole antenna provided between the second surface and the third surface, the dipole antenna being electrically connected to the semiconductor chip, the dipole antenna includes folded parts that are folded with respect to the core at the pair of end parts, and the folded parts of the dipole antenna overlap the first metal layer.

2. The RFID tag as claimed in claim 1, wherein the first metal layer is made of tin, zinc, lead, indium, or an alloy including at least one of these metals.

3. The RFID tag as claimed in claim 1, wherein the folded parts of the dipole antenna are adhered to the first metal layer.

4. The RFID tag as claimed in claim 1, wherein the dipole antenna is formed by a second metal layer made of a metal different from the first metal layer.

5. The RFID tag as claimed in claim 4, wherein the second metal layer is made of copper, silver, gold, or aluminum.

6. The RFID tag as claimed in claim 4,
wherein the insulator layer has a pattern of the second metal layer formed on the third surface, and
wherein the semiconductor chip is provided on the third surface and is electrically connected to the pattern of the second metal layer.

7. The RFID tag as claimed in claim 6, wherein the insulator layer includes folded parts that are folded with respect to the core at the pair of end parts, and the folded parts of the insulator overlap the first metal layer.

8. The RFID tag as claimed in claim 7, wherein the first metal layer at the pair of end parts is interposed between the first surface and the folded parts of the insulator layer and the dipole antenna.

9. The RFID tag as claimed in claim 7, wherein the folded parts of the insulator layer and the dipole antenna are interposed between the first surface and the first metal layer at the pair of end parts.

10. The RFID tag as claimed in claim 6, further comprising:
a protection member covering the folded parts of the dipole antenna, the insulator layer, and the first metal layer.

11. The RFID tag as claimed in claim 10, further comprising:
a filler material formed by a second elastic material and filling a space surrounded by the protection member.

12. The RFID tag as claimed in claim 10, wherein the protection member encapsulates the core, the first metal layer, the semiconductor chip, the insulator layer, and the dipole antenna.

13. The RFID tag as claimed in claim 6, further comprising:
an adhesive layer provided between the second layer and the third layer,
wherein the semiconductor chip is embedded in the adhesive layer.

14. The RFID tag as claimed in claim 1, wherein the first elastic material is a dielectric.

15. A manufacturing method of an RFID tag, comprising:
forming the RFID tag comprising a metal layer provided on a first surface of a core, a semiconductor chip provided on a second surface of the core on an opposite side from the first surface, an insulator layer provided on the second surface and covering the semiconductor chip, the insulator layer having a third surface opposing the second surface and a fourth surface on an opposite side from the third surface, and a dipole antenna provided between the second surface and the third surface, the dipole antenna being electrically connected to the semiconductor chip, the dipole antenna is folded at folded parts at a pair of end parts of the core, and the dipole antenna at the folded parts overlaps the metal layer;
inserting the RFID tag into a first protection member; and
adhering a second protection member on the first protection member, to encapsulate the RFID tag in a space formed within the first and second protection members.

16. The manufacturing method of the RFID tag as claimed in claim 15, further comprising:
filling a filler material in a gap between the RFID tag and the first and second protection members.

17. The manufacturing method of the RFID tag as claimed in claim 15, wherein:
the core is formed by an elastic material;
the metal layer is formed by tin, zinc, lead, indium, or an alloy including at least one of these metals; and
the dipole antenna is formed by a metal pattern formed on an insulator layer and made of copper, silver, gold, or aluminum.

18. An RFID tag comprising:
a core formed by a first elastic material and having a first surface, a second surface on an opposite side of the first surface, and a pair of end parts provided on mutually opposite sides and connecting to the first surface and the second surface;
a first metal layer provided on the first surface;

a semiconductor chip provided on the second surface and having a communication part;

an insulator layer provided on the second surface and covering the semiconductor chip, the insulator layer having a third surface opposing the second surface and a fourth surface on an opposite side from the third surface; and a dipole antenna provided between the second surface and the third surface, the dipole antenna being electrically connected to the semiconductor chip, the insulator layer and the dipole antenna include folded parts that are folded with respect to the core at the pair of end parts, and the folded parts of the insulator layer and the dipole antenna overlap the first metal layer.

19. An RFID tag comprising:

a core formed by a first elastic material and having a first surface, a second surface on an opposite side of the first surface, and a pair of end parts provided on mutually opposite sides and connecting to the first surface and the second surface;

a first metal layer provided on the first surface;

a semiconductor chip provided on the second surface and having a communication part;

an insulator layer provided on the second surface and covering the semiconductor chip, the insulator layer having a third surface opposing the second surface and a flat and continuous fourth surface on an opposite side from the third surface; and a dipole antenna provided between the second surface and the third surface, the dipole antenna being electrically connected to the semiconductor chip, the first metal layer includes folded parts that are folded with respect to the core at the pair of end parts, and the folded parts of the first metal layer overlap the dipole antenna.

20. The RFID tag as claimed in claim 19, wherein the folded parts of the first metal layer are provided on the fourth surface of the insulator layer or interposed between the second surface of the core and the third surface of the insulator layer.

21. The RFID tag as claimed in claim 20, further comprising:

a protection member covering the folded parts of the first metal layer, and at least one of the insulator layer and the first metal layer.

22. The RFID tag as claimed in claim 21, wherein the protection member is made of elastomer.

23. The RFID tag as claimed in claim 20, wherein the insulator layer and the dipole antenna at the pair of end parts are interposed between the second surface and the folded parts of the first metal layer.

24. The RFID tag as claimed in claim 20, wherein the folded parts of the first metal layer are interposed between the second surface and each of the insulator layer and the dipole antenna at the pair of end parts.

* * * * *